Dec. 24, 1968  E. WILDHABER  3,417,510
METHOD AND MEANS FOR CROWNING TEETH
Filed May 10, 1965

INVENTOR:
Ernest Wildhaber

United States Patent Office 3,417,510
Patented Dec. 24, 1968

3,417,510
METHOD AND MEANS FOR CROWNING TEETH
Ernest Wildhaber, Brighton, N.Y.
(124 Summit Drive, Rochester, N.Y. 14620)
Filed May 10, 1965, Ser. No. 454,330
9 Claims. (Cl. 51—95)

ABSTRACT OF THE DISCLOSURE

The teeth of gear couplings and of gears are crowned with form tools. To avoid or minimize errors in shape, the opposite sides of the teeth are crowned successively in one operation, one set-up. Crowning is obtained by relatively moving a form tool along a tooth space while the work spindle turns at a varying rate. The varying part of the motion reverses at about the middle of the teeth. Opposite tooth sides are preferably crowned in successive tool passes, each side being finished on alternate tool passes. An additional depthwise motion is used on gear coupling members which run at substantial angles. An additional motion is also used for crowing helical gear teeth.

---

The present invention relates to the production of crowned teeth on gears, on gear-coupling members, and on dies, and particularly to their production with tools having a working portion of curved and usually concave profile. Such tools are commonly referred to as form-tools.

One object of the invention is to improve the shape of the crowned members of gear-couplings produced with form-tools, removing the errors inherent in the conventional production.

A further object is to produce a desirable crown with form-tools on gear teeth.

Hitherto the desired crowning shape was attainable with form-tools on spur gears only by crowning both members of a gear pair and applying crowns approximately in proportion of the radii of profile curvature. A further aim is to provide a gear-crowning method and means whereby a required or desirable shape of crown can be attained with form-tools also by crowning only one member of the gear pair, usually the pinion or smaller member.

A further object is to provide means and a method of crowning helical gear teeth with a grinding wheel of concave profile, that avoids the oblique cut-off of the tooth bearing adjacent the tooth ends, and that is capable of producing any desired shape of tooth bearing.

Other objects will appear in the course of the specification and in the recital of the appended claims.

Figure 1:
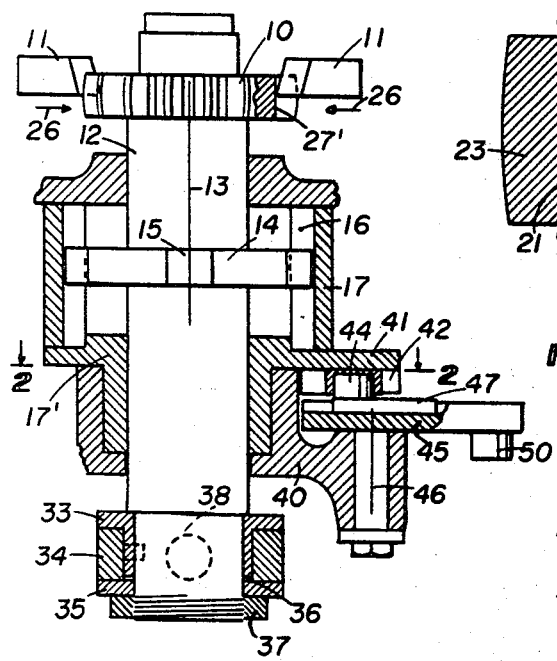
FIG. 1 is a side view of a crowning mechanism, showing also a crowned gear-coupling member in the process of being cut and crowned, looking at right angles to the axis of this member.
Figure 2:
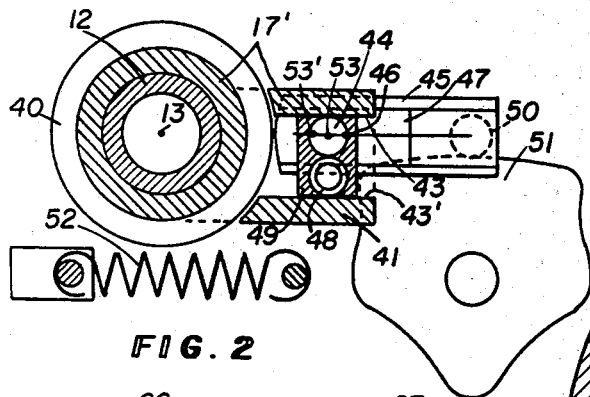
FIG. 2 is a section taken at right angles to this axis, along lines 2—2 of FIG. 1, and a view along said axis.

FIGS. 1 and 2 illustrate an application of my method to a process, where the workpiece 10 is engaged by as many cutting tools 11 as there are teeth in the workpiece. The workpiece 10 is secured to a work spindle 12 that is reciprocated along its axis 13. The tools 11 cut here in the upstroke of spindle 12 and are slightly withdrawn from cutting position during the return stroke. They are progressively fed depthwise of the teeth until full depth is reached.

A disk-like part 14 is rigid with the work spindle. It contains straight projections or teeth 15 that engage straight guide-ways 16 provided in a member 17 coaxial with the work spindle. If this member is maintained stationary, straight teeth without crowning are cut on the workpiece, provided that the tools 11 are maintained in a fixed position while they cut. In accordance with the present invention crowning is achieved by oscillating member 17 slightly during each stroke, so that the tools cut on one side of the teeth during one upstroke and on the opposite side on the next following upstroke or working stroke.

Figure 3:
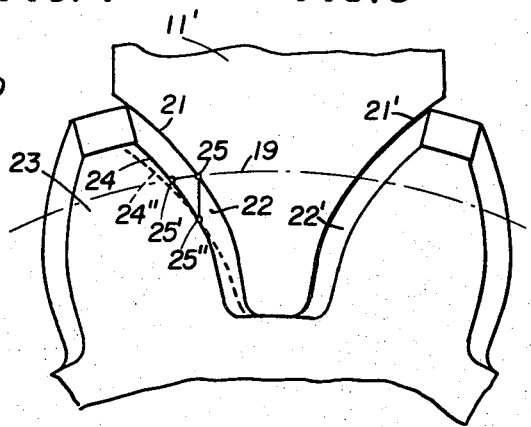
FIG. 3 is a fragmentary axial view of a crowned gear-coupling member, at a large scale, showing also a cutting tool in engagement with a tooth side thereof.

The kind of crowning obtained in this way will now be described with FIG. 3 Cutting tool 11' is a form-tool. It contains a concavely curved side-cutting edge 21 to cut side 22 of the teeth 23 with, and a side-cutting edge 21' symmetrical to edge 21 to cut side 22' with. These cutting edges are the counterparts of the profiles of the workpiece.

The profile 24 obtained at the end of the crowned tooth 23 is identical with the profile of the mid-plane. It has the same position to and distance from the axis of the workpiece. It is merely turned about said axis, whereby point 25 moves to point 25'.

This is the kind of crown desired on gears. It is also preferably used on the crowned members of gear couplings for angularities up to one degree or a degree and a half.

It has been previously proposed to crown gear-coupling members by merely cutting deeper adjacent the tooth ends with the form tools. FIG. 3 shows what kind of crown is attained thereby. The profile of the entire tooth space is then displaced radially towards the axis of the member, whereby point 25 moves to point 25" and the side profile 21 is displaced to a position 24" shown in dotted lines. This increases its profile inclination as compared with profile 24. It should not be increased. For substantial angularities it should even be decreased, as described in my Patent No. 2,922,294 granted Jan. 26, 1960.

This decrease can be accomplished by cutting slightly shallower at the tooth ends rather than deeper, and by adding to the turning motion of the workpiece as the tool moves across the face to maintain the amount of crown. As the workpiece is stroked axially the tools 11 then move radially somewhat during the cut, in the direction of arrows 26 and oppositely thereto, there being a reversal of the tool motion at mid-face. Without this additional tool motion during the cut the tooth bottoms 27' are straight. With the additional tool motion they become slightly concave.

Figures 4, 5:
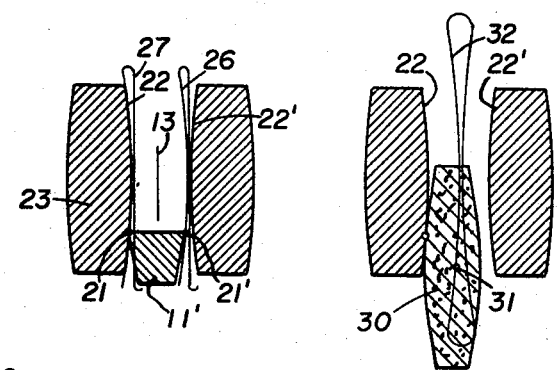
FIGS. 4 and 5 are fragmentary mean cylindrical sections taken through a toothed member coaxially therewith and developed into a plane, as for instance along a circle 19 shown in FIG. 3, showing the relative path of a tool having a single pair of side cutting edges and that of a grinding wheel respectively.

FIG. 4. illustrates the relative path of tool 11' without or with the additional tool motion. The principal cutting motion is a motion between tool and workpiece in the direction of the workpiece axis 13, or broadly a motion along a tooth space. As the workpiece turns on its axis at a varying rate in time with the cutting stroke, edge 21 follows side 22, while the opposite edge 21' described a path 26 that stays clear of the final shape of tooth side 22'. Then follows a return stroke for instance along path 27 while the tool is kept clear of engagement. In the next following cutting stroke the workpiece is turned oppositely, so that edge 21' follows and cuts side 22'. Then again tool 11' cuts on side 22 in the following stroke, and so on, the cuts on opposite sides alternating with each other. The turning motion about axis 13 reverse during the cut at the mid-plane of the workpiece, where the cut is in axial direction.

FIG. 5 illustrates the use of a rotary tool, such as a grinding wheel 30 or milling cutter. Here the forward stroke and the return stroke are both made use of. As the rotating grinding wheel relatively moves forward and back along a tooth space, the workpiece is turned on its axis at a varying rate, so that side 22 is ground in the forward stroke and side 22' is ground in the return stroke. The central point 31 of the wheel section then describes a relative path 32 in each stroke cycle. Without the turning motion of the workpiece the relative path would be in an axial plane, the plane of symmetry of the tooth space worked in.

Returning now to FIGS. 1 and 2, the work spindle 12 may contain a circular flanged part 33 rigidly secured to it. A ring-shaped part 34 bears against part 33 on one side and against a disk 35 on the opposite side. It is free to turn on axis 13 relatively to the work spindle. Disk 35 is rigidly connected to flanged part 33, as by a toothed face coupling 36, rigid engagement being maintained by a nut 37 threaded onto the work spindle. Part 34 contains a pair of coaxial pins 38 whose axis intersects axis 13 at right angles. Connecting rods acting on pins 38 may reciprocate ring-part 34 along axis 13, thereby reciprocating spindle 12 while leaving it free to turn on its axis. If desired, anti-friction bearings may be used for mounting ring-part 34 on spindle 12.

Member 17 is rigid with a member 17' rotatably mounted on a stationary portion 40 coaxially with spindle 12. Member 17' has a U-shaped projection 41 that contains a straight slot 42 with parallel plane sides 43, 43'. Their planes are parallel to axis 13. Slot 42 is engaged by a portion 44 radially adjustable on a lever 45 that is pivoted on an axis 46 parallel to axis 13. Portion 44 is preferably formed as a roller mounted on an adjustment slide 47. It engages slot side 43. A resilient roller 48 is placed between roller 44 and side 43' of slot 42, under preload. A cage 49 keeps roller 48 in place. Lever 45 contains a further roller 50 mounted thereon in a fixed position. It is engaged by a cam 51. Engagement is maintained by a spring 52, or else a double cam may be provided. Cam 51 is geared to make one turn for every two complete stroke cycles of the work spindle, that is per two working strokes and two return strokes It effects the described oscillations of the work spindle.

The cam makes one turn per stroke cycle in a grinding process where one tooth side is ground in the forward stroke and the opposite side is ground in the return stroke.

The amplitude of the work spindle oscillations depends on the amount of crowning and on the diameter of the workpiece. The adjustment provided for roller 44 lets us attain the required amplitude without cam change. To obtain larger oscillations, the roller axis 53 is set to a larger distance from the lever axis 46, as for instance to position 53'.

To cut crowned helical teeth, member 17 is replaced with a member that contains helical guide-ways; and part 14 is replaced with a part that contains helical teeth. Or else these teeth may be replaced with rollers turning on radial axes. In this case the alternative part 15 is left unchanged for both straight and helical teeth.

While lever 45 acts directly on a part 17' coaxial with the work spindle, the part acted on may merely be operatively connected with the work spindle.

In grinding, a single wheel or a pair of wheels are preferably used. This is also possible in cutting. Also broach type cutters may be used that first rough out while the work spindle is stationary. The oscillation of the work spindle then starts only for finishing.

In cutting crowned gear-coupling members with tools 11 I preferably maintain the oscillation of the work spindle throughout the cutting process. In cutting crowned gear teeth however the oscillation may be started after roughing, if desired.

Alternate cutting on opposite sides is a production asset on many materials, because then the chips are not formed on all sides simultaneously, getting into each other's way. At equal cutting times the thicker side chips on one side are often preferable to side chips on both sides that have half the thickness but twice the total length.

The described motions apply also to grinding crowned straight teeth or broadly teeth extending along axial planes. However, when it comes to grinding helical teeth and some other shapes with form-wheels a further motion is required to attain the desired crowning shape. This applies also to milling.

Form-tools are not used with the conventional rolling-generating motion of a rack rolling on the gear to be produced. They have simpler motions requiring a curved working profile in an axial plane. Generally this profile is concave for producing the usual crowning and convex for producing negative crowning, with teeth thickest at their ends, as may be required on dies and some tools.

Figure 6:
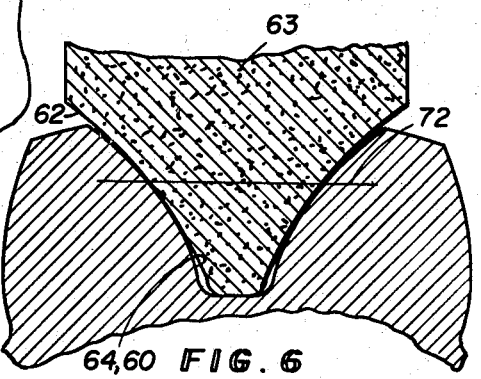
FIG. 6 is a fragmentary large-scale normal section through the teeth of a helical gear and through a grinding wheel in engagement therewith, taken at right angles to the center line of a tooth space.
Figure 7:
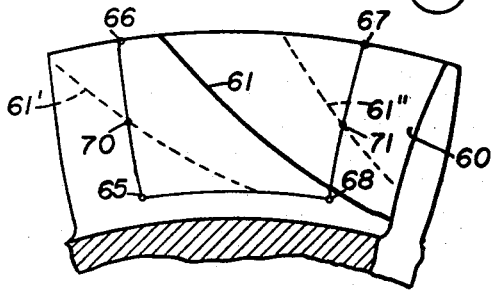
FIG. 7 is a front view of a helical gear tooth, showing the boundaries of a tooth bearing attainable by crowning in accordance with the invention.

With helical teeth, the working surface of the wheel or rotary tool contacts a tooth side 60 (FIG. 7) along an oblique line 61, so that in a section perpendicular to a tooth space (FIG. 6) the profile 62 of the grinding wheel 63 is less curved than the profile 64 of the tooth side 60. FIG. 7 illustrates crowning by the shape of a tooth bearing attained. As a crowned gear is run with its mating gear in the correct mounting position, the tooth contact does not sweep the entire length of the teeth, but only a localized area thereof, the tooth bearing. The desired shape of a tooth bearing without profile ease-off is for instance an area such as that within the near-rectangle 65–66–67–68 But the tooth bearing attained without additional motion ends along the inclined dotted lines 61', 61" which approximately retain the inclination of the mean line 61 of grinding contact.

To attain the generally rectangular shape the profile inclination should be increased at point 70 and decreased at point 71.

In accordance with the invention this is preferably accomplished by adding a straight-line displacement of the tool in a plane 72 parallel to the axes of the grinding wheel and of the work spindle, and following up this displacement with an added or modified turning motion about the axis of the work spindle to retain contact at the same points 70, 71 when grinding side 60. The same procedure is followed for the opposite side. The points 70, 71 are successively ground in an altered turning position of the workpiece, so that the profile inclination is altered in the desired way.

In a preferred embodiment the rotary tool is displaced along its axis. It should be noted that the added displacement in plane 72 does not reverse during working contact, but is continuously in one direction on each side.

The term crowning should be understood to mean broadly an alteration of the straight or helical shape of the tooth surfaces increasing towards the tooth ends, and to include leaving extra material as well as removing material there For definition of the scope of the invention reliance is put on the appended claims.

I claim:

1. The method of producing crowned teeth on a member, which comprises providing a tool that has a working portion of curved profile on opposite sides, effecting reciprocatory relative motion between said tool and said member along a tooth space of said member while turning said member on its axis at a varying rate timed to said relative motion as the tool moves relative to said member from one end of the tooth space to the other, said turning motion being reversed when said tool is near the longitudinal center of each tooth side, one side of said tool operating on one side of said tooth space and the opposite side of said tool operating on the opposite side of said tooth space, said tool being shifted relative to the tooth space from one side of the tooth space to the other in the same operation without manual intervention by modifying said turning motion.

2. The method according to claim 1, wherein said tool is a grinding wheel, wherein said relative motion is successively in opposite directions, and wherein said grinding wheel operates on one side of the tooth space it follows when said relative motion is in one direction and operates on the opposite side of said tooth space when said relative motion is in opposite direction.

3. The method of producing teeth on a member, which comprises providing as many tools as there are teeth on said member, each tool having a pair of opposite concavely curved side-cutting edges connected by an end-cutting edge, reciprocating said member along its teeth to effect cutting strokes, feeding said tools depthwise of said teeth to progressively cut to full depth, turning said member on its axis at a varying rate in time with said strokes, said turning motion being in opposite directions on successive strokes, to cut opposite sides of said teeth on alternate cutting strokes.

4. The method according to claim 1, wherein an additional motion is effected between the tool and member for perfecting the shape of the crown, said additional motion being timed with said relative motion along a tooth space to produce concave tooth space bottoms.

5. The method of producing crowned helical teeth on a gear, which comprises providing a rotary tool that has a working portion of concavely curved profile, effecting relative helical motion between said tool and a gear to be produced along and about the axis of said gear while further turning said gear on its axis at a varying rate timed to said relative motion, said further turning motion being reversed at approximately the longitudinal center of each tooth side while said tool is in engagement with said gear, and effecting an additional motion between said tool and gear in time with said relative motion, said additional motion being a straight-line motion in a plane parallel to the axes of said gear and of said tool and at an angle to the gear axis, said further motion and said additional motion combining to cause the tool to operate on opposite sides of the teeth on successive working strokes.

6. The method according to claim 5, wherein said tool is a grinding wheel and wherein said additional motion is in the direction of the axis of said grinding wheel.

7. In a machine for crowning teeth, a work spindle for holding a workpiece, a tool having cutting portions of curved profile on opposite sides corresponding to the profiles of the teeth to be cut on the gear, means for effecting reciprocatory relative motion between said tool and the work spindle in the direction of the axis of rotation of the work spindle, and means for oscillating the work spindle on said axis comprising an oscillatory lever having an axis of oscillation parallel to the first-named axis, cam means for oscillating said lever including a cam rotating continuously in one direction and a lever having a portion in engagement with a portion secured to said work spindle, means for adjusting one of said portions to different radial distances from the second-named axis to change the ratio of the motion transmitted from said cam to said work spindle, and means for effecting said reciprocatory motion in time with the rotation of said cam.

8. A machine according to claim 7, wherein the portion on said lever is a roller that is radially adjustable thereon, and the portion secured to said work spindle contains a straight slot engaged by said roller.

9. In a machine for crowning teeth by oscillating a work spindle carrying a work piece on its axis of rotation, an oscillatory lever having an axis of oscillation parallel to the first-named axis, cam means for oscillating said lever, a portion on said lever being in engagement with a portion on said work spindle for transmitting motion therebetween, and means for adjusting one of said portions to different radial distances from the respective axis, for changing the ratio of transmitted motion, the portion on said lever being a roller that is radially adjustable thereon, the portion engaged by said roller containing a straight slot, and said roller engaging one side of said slot, and on the opposite side engaging a preloaded roller that is in engagement with the opposite side of said slot.

References Cited

UNITED STATES PATENTS

| | | |
|---|---|---|
| 1,492,611 | 5/1924 | Stevenson. |
| 1,845,172 | 2/1932 | Morey. |
| 2,319,117 | 5/1943 | Drummond _____ 51—287 X |
| 2,804,734 | 9/1957 | Mentley _____ 51—95 X |

HAROLD D. WHITEHEAD, *Primary Examiner.*

U.S. Cl. X.R.

51—287; 40—3, 6